United States Patent Office 3,011,444
Patented Dec. 5, 1961

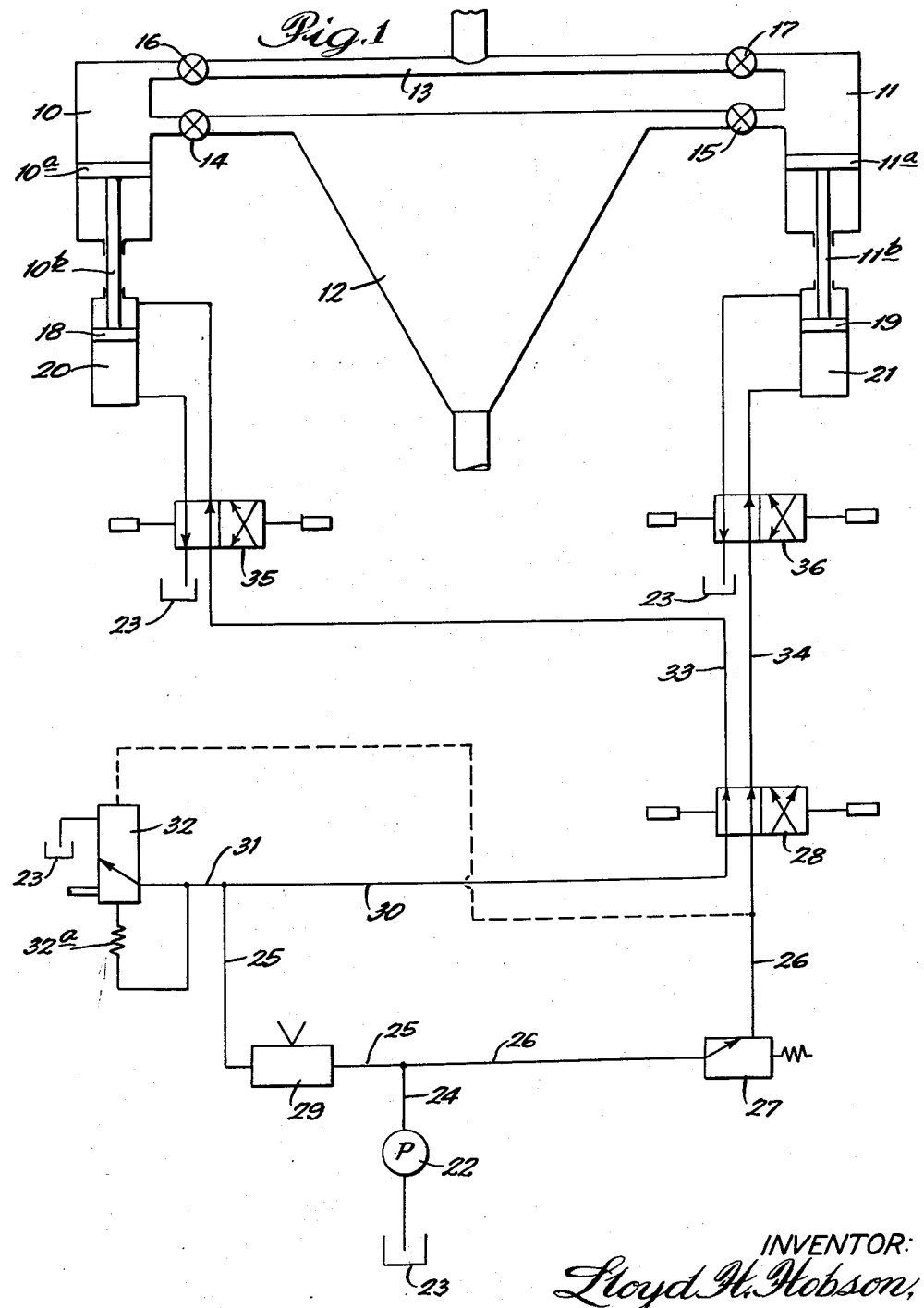

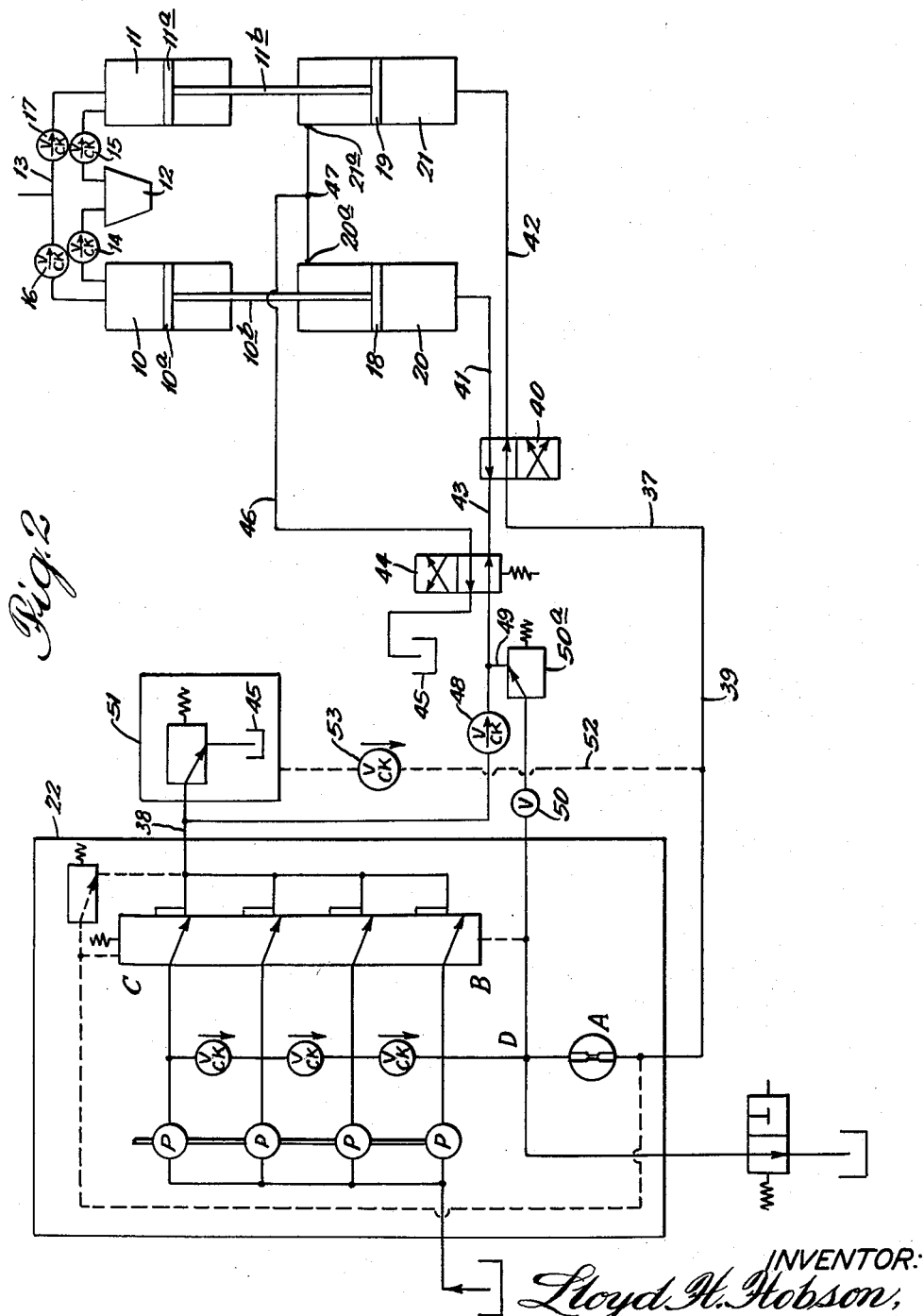

3,011,444
METHOD AND APPARATUS FOR APPLYING A PASTE-LIKE MATERIAL CONTAINING A GAS
Lloyd H. Hobson, Lemont, Ill., assignor to Plastering Development Center, Inc., Chicago, Ill., a corporation of Illinois
Filed Nov. 21, 1957, Ser. No. 697,899
4 Claims. (Cl. 103—6)

This invention relates to a method and apparatus for applying a paste-like material containing a gas. This invention has utility in pumping a material such as fluid plaster or associated building materials.

It has been considered desirable to apply plasters, mortars, cements, and other allied materials of construction as a continuous stream. These paste-like materials are provided in a suitable fluid state and contain, as an important ingredient, a gas, generally air. The gaseous element in paste-like materials is important in providing internal lubrication of the material so as to achieve the desired flow. Without such gaseous lubrication, a satisfactory flow is virtually impossible with many mixes. By entraining a multitude of small bubbles in the paste, superior lubrication of the various solid particles making up the paste is achieved. When this fine dispersion of gas is lost, as by agglomeration of the bubbles, so also is the very desirable internal lubrication. It has, therefore, been a problem facing those concerned with applying gas-containing paste-like materials to maintain gas bubble dispersion in a stream of the material.

Another problem facing those in this field is the delivery of a stream of paste that is uniform in volume throughout the period of application. Where the paste is sprayed through a nozzle, and the volume fed to the nozzle per unit of time is variable, the spray velocity at the nozzle would likewise change. In a machine for applying plaster, for example, when the velocity increased over the preset optimum, the plaster might hit the wall and splatter back in the operator's face or on the floor. If the volume and, therefore, the velocity were lower than the optimum, the spray pattern might not be good and the plaster might not reach the surface of application. In the case of a plaster stream, the velocity is particularly critical when spraying the first coat of plaster on metal lath. If the velocity is too high, too much plaster goes through the lath; if the velocity is too low, not enough plaster goes through the lath to afford a good mechanical bond.

Undesirable though that a pulsating stream was, it was felt that it had to be tolerated since the very nature of the paste-like materials made them difficult to move except in positive displacement devices. Such devices could provide a uniform stream, even of a sluggish material like a paste, provided the paste were substantially non-compressible. But where the paste is compressible, as it must be to achieve the necessary flow characteristics, it resulted in pulsating streams since a portion of the time a discharge pressure was applied was used in compressing the gas. Thus, in a twin-cylinder pump there were two flow interruptions each cycle.

Under such conditions, even an experienced operator had difficulty, especially in view of the fact that gas-containing pastes such as fluid plaster vary widely in their compressibility from batch to batch and from one use to another. This variation also limited the usefulness of a multicomponent machine which would operate satisfactorily under only a single condition.

Positive displacement expedients in the past have also been handicapped in their operation by the agglomerative tendency of the lubricating gas bubbles. In some cases, the gas bubbles agglomerate to such an extent that they not only impair fluidity of the paste but also actually create flow interruptions in themselves.

It is a general object of this invention to provide a method and apparatus for applying paste-like materials which overcome the disadvantages and drawbacks set forth above. Another object is to provide a new method of handling a compressible paste which provides an even, constant flow of the paste. Another object is to provide a method and apparatus for applying a gas-containing paste in which the agglomerative tendency of the gas bubbles in the paste is substantially inhibited. A still further object is to provide an improvement in an apparatus employing a plurality of compression chambers wherein variations in the velocity of a compressible paste stream issuing from the chamber due to the compressibility of the paste are substantially eliminated. Yet a further object is to provide an improved apparatus for applying a paste such as plaster in which a compressible paste is pre-compressed in one segmental stream while another segmental stream is being discharged. A still further object is to provide an improved apparatus for applying a compressible paste incorporating a novel fluid pressure circuit that efficiently transmits pressure to a plurality of cylinder and piston units. Other objects and advantages of this invention can be seen as this specification proceeeds.

This invention will be described in conjunction with the accompanying drawing, in which FIG. 1 is a schematic representation of an apparatus for applying a paste-like material containing a gas; and FIG. 2 is a schematic representation of another form of apparatus for the same purpose.

In the illustration given, the numerals 10 and 11 designate a pair of cylinders adapted to be charged with a compressible paste such as a gas containing plaster from a hopper 12 and discharge it through a nozzle-equipped hose 13. The conduits connecting hopper 12 with cylinders 10 and 11 are equipped with suitable intake valves 14 and 15. When piston 10a of cylinder 10 moves downwardly, check valve 14 opens and plaster is drawn into cylinder 10. Upward movement of piston 10a causes check valve 14 to close and opens discharge valve 16 in the conduit connecting the discharge port of cylinder 10 with hose 13. A similar discharge valve 17 is provided in the conduit between hose 13 and cylinder 11, valves 15 and 17 being actuated by piston 11a of cylinder 11 and the flow of material induced thereby.

Reciprocably mounted within cylinders 10 and 11 are work pistons 10a and 11a, respectively. Extending through the power end walls and cylinders 10 and 11, respectively, are piston rods 10b and 11b, secured to power pistons 18 and 19, respectively. Power pistons 18 and 19 are reciprocably mounted within cylinders 20 and 21.

In the operation of a compression chamber arrangement such as the cylinder and piston units shown, when piston 10a is moving upward to pump (intake valve 14 being closed and discharge valve 16 being open), piston 11a of cylinder 11 moves quickly downwardly to draw a fresh charge of plaster through intake valve 15 into cylinder 11 (discharge valve 17 being closed). After the cylinder 11 is filled with plaster, and while piston 10a is still moving upwardly, the motion of piston 11a is reversed with piston 11a now moving upwardly, valve 15 now being closed and valve 17 still remaining closed. The upward movement of piston 11a continues until the pressure in cylinder 11 is just below the discharge pressure in cylinder 10 (necessary to open discharge valve 17). At this point, piston 10a is still moving upwardly to discharge plaster through valve 16, so piston 11a remains stationary (thereby holding the plaster in cylinder 11 under a pressure just less than the discharge pressure and for a discrete time) until the piston 10a in cylinder 10 reaches the end of its pumping stroke. Thereafter, piston 11a in cylinder 11 again moves upwardly, this movement producing a discharge of plaster through valve 17.

Thus, a segment of a continuous stream of a paste containing a gas is compressed during the discharge of a second segment. In the case of plaster, the compression may be substantial since such building materials may contain from about 5% up to about 65% of a gas, usually air. When the discharge pressure is high, and it may be in the range of 150–600 p.s.i.(g.), the gas in the paste is reduced to a low fraction of its volume at atmospheric pressure. At higher discharge pressures of the order indicated, the paste can be compressed an amount almost equal to the percent gas it contains. Thus, with a paste containing 65% gas, the piston moves almost 65% of its stroke to precompress the paste and before discharge occurs.

By performing this compression during the discharge of paste from a second compression chamber, the unwanted pulsations in flow are eliminated. It is to be appreciated that if a pair of cylinder and piston units were operated by a common eccentric or bell crank, the output would fall to zero about 65% of the time where a paste was being discharged that contained about that amount of gas.

The step of compressing a gas containing paste in one stream while discharging a second segmental stream, not only solves the difficult problem of even flow, but at the same time provides a stream in which the desirable gas bubble dispersion is maintained, thereby insuring the internal lubrication needed for proper fluid flow. The bubbles of gas in the paste have a tendency to agglomerate whenever the paste is stationary and under reduced pressure. By keeping the paste either moving or under super-atmospheric pressure from the time it leaves the hopper until it is discharged into the hose, the bubble dispersion is preserved against agglomeration.

Exemplary of the paste-like materials containing gases that can be applied through the teaching of this invention are such materials of construction as plaster, gypsum, Portland cement, etc. Set forth below are examples of typical formulations applied according to this invention:

EXAMPLE I

Plaster was prepared containing 100 lbs. of gypsum ($CaSO_4 \cdot \frac{1}{2}H_2O$). To this was added 3 cubic feet of sand and 60 lbs. of water, along with a suitable air-entraining agent. The mix was thereafter suitably beaten to entrain air in the range of 5% by volume.

Air-entraining agents are well known and need not be described in detail. For example, Vinsol resin, which is defined on page 605 of "Handbook of Material Trade Names," by Zimmerman and Levine (TP12.Z72, 1953), may be employed. An air-entraining agent produced and sold by Procter & Gamble Company under the trade-mark "Orvus" and which contains sodium alkyl aryl sulfonate as the active ingredient, may be used. Soap bark may also be employed. Wetting agents which are effective in lowering surface tension and bringing air about the particles and forming bubbles within the mixture for retaining air, are well known. It is common to employ in Portland cement and in gypsum certain agents which are effective in entraining air into the mix. In view of the general use of entraining agents, it is believed unnecessary to define them further herein.

As above stated, the air may be incorporated into the mix by mechanical means as by employing mixers which mechanically, during the beating operation, force air into the mixture to greatly increase the air content of the mixture.

EXAMPLE II

A paste-like mix was prepared based on 94 lbs. of gypsum to which 5 cubic feet of Perlite were added along with 75 lbs. of water. Mechanical agitation of this mix entrained 33% by volume of air.

EXAMPLE III

A mix containing 100 lbs. of gypsum, 34 lbs. of Perlite and 109 lbs. of water was prepared, which, after beating, contained 22% air by volume.

EXAMPLE IV

A mix containing 94 lbs. of Portland cement, 40 lbs. of Perlite and 90 lbs. of water along with a suitable air-entraining agent was mechanically mixed, after which the air entrained amounted to 65% of the volume.

The formulations of the foregoing examples can be satisfactorily discharged in a continuous stream according to the teachings of this invention. It is to be noted that a wide range of air volumes is possible. Satisfactory results have been achieved with mixes in which the air volume ranges in percentage from about 5% up to about 65%.

The compression chamber structure set forth in FIG. 1 can be operated by the hydraulic pressure fluid circuit also shown in FIG. 1. Although mechanical means can be employed to actuate pistons 18 and 19, I have found that very satisfactory results are obtained when the pistons are operated by hydraulic pressure.

In the illustration given in FIG. 1, the numeral 22 designates a hydraulic oil pump which draws oil from a tank 23. The outlet of pump 22 is coupled to a conduit 24 which leads to a pair of conduits 25 and 26. Thus, hydraulic fluid such as oil from pump 22 can flow through conduits 25 and 26. Interconnected in conduit 26 is a pressure-reducing valve 27 and thereafter a selector valve 28.

Interconnected in conduit 25 is a constant flow valve 29, the output of which may flow through conduit 30 to selector valve 28. The output of valve 29 also flows through conduit 31 to differential pressure relief valve 31 and through valve 32 back to tank 23.

The output of selector valve 28 flows through conduits 33 and 34 to a pair of reversing valves 35 and 36, respectively, which are associated with cylinders 20 and 21, respectively.

Reversing valves 35 and 36 determine whether the oil flow goes into the bottom or the top part of the cylinder with which they are associated. These valves are actuated by switches responsive to the travel of pistons 18 and 19 in cylinders 20 and 21. Many suitable forms of limit switches can be employed in this connection, since the valves 35 and 36 merely serve to reverse the direction of the travel of pistons 18 and 19. The function of selector valve 28 is to determine whether oil flowing through valve 27 goes to cylinder 20 or cylinder 21 and whether the oil flowing through valve 29 goes to cylinder 20 or cylinder 21.

It is believed that a brief description of the operation of this hydraulic circuit will make clearer the relationship of the various parts. For that purpose, it is assumed that the piston 19 in cylinder 21 is moving upwardly to discharge plaster through valve 17 into hose 13. Hydraulic fluid from pump 22 flows through pressure reducing valve 27 and thereafter through selector valve 28 from which it flows into the bottom portion of cylinder 21 to drive piston 19 upwardly and discharge plaster.

While this is being done, hydraulic fluid from pump 22 flows through valve 29 and thereafter through selector valve 28 and into the top part (piston rod end) of cylinder 20. This serves to return the piston and load cylinder 10 with plaster. When the piston 18 in cylinder 20 reaches the bottom part of its stroke, valve 35 reverses and the oil flows through valve 29, then goes into the bottom part of cylinder 20 to drive the piston forward and compress the plaster. This action closes intake valve 14 but does not provide sufficient pressure to open discharge valve 16, both of which valves are associated with cylinder 10, cylinder 10 being operatively connected with cylinder 20.

The extent to which piston 18 precompresses plaster in cylinder 20 is determined by the operation of differential pressure relief valve 32. When the pressure in the bottom part of cylinder 20 becomes just less than the pressure in the bottom part of cylinder 21, valve 32 opens and all of the oil from valve 29 goes into the tank rather than into cylinder 20 while still maintaining the pressure in cylinder 20 at slightly less than that in cylinder 21. The dotted line from valve 32 to conduit 26 permits the pressure existing in cylinder 21 to be applied to one side of valve 32. On the other side of valve 32, the pressure existing in conduit 25 is applied. This latter pressure is that which is responsible for returning the piston 18 and thereafter precompressing plaster in cylinder 20.

While valve 32 is shown schematically, it can take the form of a housing containing a spool or piston with conduits for applying pressure on each end of the spool. On one end of the spool, pressure of oil coming through valve 27 is applied. On the other end of the spool, pressure of oil coming through valve 29 is applied. By employing a spring 32a as additional force on the end of the spool at the point where oil from valve 29 applies pressure on the spool, the valve can be made to open the circuit from valve 29 and divert that oil to the tank. Alternatively, valve 32 can be eliminated by substituting a variable flow valve for constant flow valve 29 and manually adjusting it for mixes of different compressibilities.

To further explain the operation of the hydraulic circuit in practice, a spring pressure can be used of 50 p.s.i. Where the oil driving piston 19 in cylinder 21 is under a pressure of 600 p.s.i., the pressure of oil flowing through valve 29 would be a relatively low figure when piston 18 was returning to load cylinder 20 with fresh plaster. When the travel of piston 18 is reversed, the pressure of oil flowing through valve 29 increases until it reaches about 550 p.s.i. When this point is reached, 600 p.s.i. is applied to the top of valve 32 and 550 p.s.i. hydraulic pressure on the bottom part of that valve along with the 50 p.s.i. spring pressure. Further increase of hydraulic pressure in the oil flowing through valve 29 does not result in further compression of the plaster in cylinder 20, but rather causes valve 32 to open so as to divert all of the oil flow from valve 29 to tank 23. By this means, the piston that is compressing the plaster will always hold the same pressure differential between compressed plaster and plaster being pumped, regardless of the compressibility of the mix or the discharge pressure of the pump.

Since a constant flow valve such as valve 29 has a pressure drop through it, compensation for this pressure drop is achieved by using a pressure reducing valve such as is designated valve 27. Without valve 27, operation with little or no hose pressure might result in all of the oil flow to the cylinder discharging plaster with none going through valve 29.

A number of hydraulic circuits can be employed successfully in the practice of this invention. An alternate to the circuit fo FIG. 1 is shown in FIG. 2 and is generally designated by the numeral 37. This connects cylinders 20 and 21 with a pump 22, the piston and cylinder arrangement being the same as in FIG. 1. Extremely satisfactory operation of the paste-applying machine of this invention has been achieved when a variable volume pump is employed—a pump yielding both high pressure and low pressure hydraulic fluid as well as a variable rate of flow. In the illustration given, the pump is represented schematically and includes four individual pumps designated "P." The high pressure output of the pump goes through a variable orifice marked "A." There is a sliding sleeve valve in the pump marked "B—C." To control the volume of the pump, orifice "A" is adjusted to provide a certain pressure drop with a given volume. If the volume output of the pump is too high, the pressure drop is greater, so that a high pressure is built up on the upstream side of orifice "A," and the same pressure is exerted at "B" on the sliding sleeve valve. This causes the valve sleeve to move towards "C," channeling some of the hydraulic fluid into the circuit designated 38, where it would normally go back to the reservoir or sump associated with the intake of pump 22.

High pressure hydraulic fluid in a controlled amount is taken from the outlet of the pump connected to orifice "A" and is circulated through conduit 39. Conduit 39 is connected to a port of a four-way or reversing valve 40. A pair of ports of reversing valve 40 are connected with the power ends of cylinders 20 and 21, these conduits being designated 41 and 42, respectively. Thus, it is to be seen that movement of the valve element of reversing valve 40 directs high pressure fluid from orifice "A" either into cylinder 20 or cylinder 21, depending upon the position of the internal valve element of reversing valve 40.

The fourth port of reversing valve 40 is connected by means of a conduit 43 to a port in a second reversing valve 44. Another port of reversing valve 44 is shown connected to a sump 45 which communicates with the intake of pump 22. A third port of reversing valve 44 is connected by means of conduit 46 to the work ends of cylinders 20 and 21, as at 20 a and 21a, respectively. Direct communication between the work ends of cylinders 20 and 21 is provided by means of conduit 47.

The fourth port in reversing valve 44 is connected with conduit 38, and thereby receives low pressure hydraulic fluid from pump 22. Interconnected in conduit 38 is a check valve 48, limiting fluid flow to a direction only away from pump 22. Downstream of check valve 48, conduit 38 is joined by a conduit 49, which at its other end is coupled to the high pressure side of pump 22 as at point "D." Interconnected in conduit 49 is a constant flow valve 50.

Associated with conduit 38 and upstream of check valve 48 is a pilot-operated pressure relief valve 51. When valve 51 is open, fluid from pump 22 flowing in conduit 38 is directed back to a sump shown schematically adjacent valve 51 and designated 45. Interconnecting valve 51 and conduit 39 is conduit 52 equipped with check valve 53 permitting fluid flow only in the direction from valve 51 to conduit 39.

Pistons 10a and 11a can be provided with switches which initiate signals for the operation of reversing valves 40 and 44. Satisfactory results have been achieved when the high pressure surge produced by pistons 18 and 19, upon contacting the bottoms of their respective cylinders, is employed to close contacts on switches, which switches in turn operate sequential electrical relays, the relays in turn energizing solenoids on the reversing valves. Alternatively, limiting switches can be employed in conjunction with the pistons which actuate the solenoid-controlled reversing valves directly.

For the purpose of further explaining the invention, the following description of the operation of the structure set forth above is given:

Operation

In the diagram as pictured in FIG. 2, piston 11a is discharging paste. Piston 18 is about to start its compressing stroke. At this point, high pressure hydraulic fluid from pump 22 issuing through orifice "A" is connected to the power side of power piston 19 through reversing valve 40 The power side of piston 18 is supplied with hydraulic fluid through conduits 43 and 41, which are interconnected through four-way valve 40 also. Pressurized hydraulic fluid flowing in conduit 43 is derived from pump 22 through constant-flow valve 50, conduit 49, and reversing valve 44. This fluid is at a slightly lower pressure than the fluid in conduit 39, but at a substantially higher pressure than the fluid in conduit 38. The fluid from conduit 49 is employed to pre-compress fluid plaster with which cylinder 10 is charged so as to eliminate the undesirable pulsation described above. At the completion of the stroke of piston 19, the position of reversing valve 40 is charged from that pictured to its alternative position. This directs high pressure hydraulic fluid from conduit 39 into cylinder 20 and against the power side of power piston 18. This in turn produces movement of piston 10a in cylinder 10 to discharge fluid plaster. Hydraulic fluid from the work end of cylinder 20 is forced out of port 20a and into port 21a at the work end of cylinder 21, causing the return of piston 19 and drawing fluid plaster into the work end of cylinder 11. At the same time, low pressure hydraulic fluid in conduit 38 is forced into the work end of cylinder 21 by virtue of the change in position of the valve element within reversing valve 44—the change in position to the alternative setting from that shown in the drawing. The combination of the low pressure hydraulic fluid in conduit 38 and the fluid forced out of cylinder 20 plus fluid in line 43 coming through valve 50 causes a quick return of piston 19. When the returning piston 19 reaches the bottom of its stroke and has thereby loaded cylinder 11, valve 44 is caused to reverse its position to that shown in the drawing by virtue of the actuation of limit switches, or the like, positioned at the power end of the plaster cylinders. The low pressure hydraulic fluid in conduits 43 and 41 causes piston 19 to move forwardly and pre-compresses the plaster contained in cylinder 11.

At approximately 100 or 150 p.s.i., valve 51 opens and discharges low pressure oil back to sump 45. At this point, fluid in conduit 49 continues to flow through conduits 43 and 41 into the power end of cylinder 21 to continue the pre-compression of plaster in cylinder 11. The hydraulic fluid passing through the flow control valve 50 is low in volume, but is at a higher pressure than that delivered to conduit 38. Inasmuch as the hydraulic fluid delivered to valve 50 issues from the highest pressure port of pump 22, a pressure-reducing valve 50a is associated with valve 50 to reduce the pressure of the hydraulic fluid in conduit 49 to a valve lower than the pressure of the fluid in conduit 39. Extremely satisfactory operation of the system shown has been achieved when pre-compression of plaster is continued to a point where the pressure within cylinder 21 is about 10 p.s.i. less than the pressure in cylinder 20. In some instances, the pumping pressure within cylinder 20 (or in cylinder 21 during the opposite phase of the cycle) may reach around 800 p.s.i.

Conduit line 52, which connects valve 51 and conduit 39, is employed to take out of service the low pressure circuit provided by conduit 38 when the machine is running at an extremely low pressure of is being washed out with water. Ordinarily, the pressure of the hydraulic fluid is higher than the plaster pressure by a ratio of about two to one. Thus, if valve 50 is set at about 150 p.s.i., at any time the plaster pressure is higher than 75 p.s.i. the high pressure fluid circuit would be at a pressure at least 150 p.s.i. or higher. Under such condition, the low pressure fluid would be inadequate to cause the piston providing pre-compression to act as a pumping piston. When, however, the machine is operated at about 25 p.s.i. plaster pressure, the fluid pressure in the pumping cylinder (number 20 in the operation procedure set forth above) would be 50 p.s.i. Since the pressure relief valve 51 is set for about 150 p.s.i., it would return piston 19 and thereafter urge it forward into a pumping sequence. Through the provision of conduit 52 and check valve 53, any time the pressure in conduit 38 is higher than the pressure of fluid in conduit 39, fluid flows from conduit 38 to conduit 39 and causes valve 51 to direct fluid into sump 45.

In some instances, even lower operating pressures than those indicated above can be employed. For example, the discharge pressure can be as low as 15 p.s.i. (g.).

Thus, the gas in the mix is reduced in volume to about one-half its volume at atmospheric pressure. By providing this reduction in the precompression step applied to one stream while a second stream is being discharged, the desirable objectives of this invention can be achieved. Discharge pressures, however, are generally above the minimum value indicated above.

While in the foregoing specification embodiments of the invention have been set out in considerable detail for purposes of adequate illustration, it will be apparent that those skilled in the art may deviate considerably in these details without departing from the spirit and principles of the invention.

I claim:

1. In a process for applying a continuous stream of fluid plaster having at least 5% gas therein from a plurality of cylinder and piston units, the steps of drawing plaster into at least one unit by applying a reduced pressure thereto, compressing the plaster in said one unit substantially without pause after the said drawing step, maintaining the plaster in said one unit under pressure, all while discharging plaster from a second unit, the said compressing step reducing the volume of said gas to at least about one-half its volume at atmospheric pressure.

2. In a process of providing an even, continuous stream of plaster containing at least about 5% of a gas delivered by sequentially discharging a plurality of chambers charged with said plaster, the steps of drawing said plaster into one of said chambers and immediately thereafter reducing the volume of said one of said chambers and thereby pressurizing the same to reduce the volume of gas therein to at least about one-half its volume under atmospheric pressure, all while discharging plaster from a second of said chambers.

3. In a process of providing an even, continuous stream of plaster containing from 5% to 65% of a gas, said plaster stream being delivered by sequentially discharging a plurality of chambers charged with said plaster, the steps of drawing said plaster into one of said chambers and substantially without pause thereafter reducing the volume of said one of said chambers and thereby pressurizing the same to reduce the volume of gas therein to at least about one-half its volume under atmospheric pressure, all while discharging plaster from a second of said chambers.

4. In a process for applying a continuous stream of plaster from a plurality of cylinder and piston units, said plaster having from 5% to 60% of gas therein, the steps of drawing plaster into at least one unit by applying a reduced pressure thereto substantially without pause, thereafter reducing the volume of said one unit and thereby compressing the plaster in said one unit to at least about one-half its volume at atmospheric pressure while discharging plaster from a second unit.

References Cited in the file of this patent

UNITED STATES PATENTS

| | | |
|---|---|---|
| 2,178,396 | Landenberger | Oct. 31, 1939 |
| 2,274,224 | Vickers | Feb. 24, 1942 |
| 2,281,767 | Heckert | May 5, 1942 |
| 2,366,417 | MacMillin | Jan. 2, 1945 |
| 2,424,750 | Heckert | July 29, 1947 |
| 2,424,751 | Heckert | July 29, 1947 |
| 2,442,916 | Buchanan | June 8, 1948 |
| 2,660,955 | Kent, et al. | Dec. 1, 1953 |
| 2,690,715 | Pope | Oct. 5, 1954 |
| 2,819,835 | Newhall | Jan. 14, 1958 |
| 2,858,767 | Smith | Nov. 4, 1958 |